US009382834B2

(12) United States Patent
Dieler et al.

(10) Patent No.: US 9,382,834 B2
(45) Date of Patent: Jul. 5, 2016

(54) METHOD OF OPERATING AN INTERNAL COMBUSTION ENGINE WITH LOW NO$_x$ COMBUSTION

(71) Applicant: DAIMLER AG, Stuttgart (DE)

(72) Inventors: Torsten Dieler, Stuttgart (DE); Dirk Haase, Leutenbach (DE); Ruediger Herweg, Esslingen (DE)

(73) Assignee: DAIMLER AG, Stuttgart (DE)

( * ) Notice: Subject to any disclaimer, the term of this patent is extended or adjusted under 35 U.S.C. 154(b) by 374 days.

(21) Appl. No.: 13/858,015

(22) Filed: Apr. 6, 2013

(65) Prior Publication Data

US 2013/0276753 A1    Oct. 24, 2013

Related U.S. Application Data

(63) Continuation-in-part of application No. PCT/EP2011/005003, filed on Oct. 7, 2011.

(30) Foreign Application Priority Data

Oct. 7, 2010    (DE) .................. 10 2010 047 796
Mar. 31, 2011    (DE) .................. 10 2011 015 626

(51) Int. Cl.
*F02B 17/00*    (2006.01)
*F02B 5/00*    (2006.01)
(Continued)

(52) U.S. Cl.
CPC ............ *F02B 11/00* (2013.01); *F02D 41/3041* (2013.01); *F02D 41/3064* (2013.01); *F02D 41/006* (2013.01); *F02D 41/0057* (2013.01); *Y02T 10/128* (2013.01)

(58) Field of Classification Search
CPC .... F02B 2075/125; F02B 17/005; F02B 1/12; F02D 41/3029; F02D 2041/389; F02D 2041/001; F02D 41/18; F02D 41/0002
USPC .................. 123/295, 305, 429; 701/102, 103
See application file for complete search history.

(56) References Cited

U.S. PATENT DOCUMENTS

| 7,240,659 B2 * | 7/2007 | Yang .................... F02D 35/025 123/294 |
| 7,669,578 B2 * | 3/2010 | Yamashita ............. F02B 17/00 123/295 |
| 7,769,525 B2 * | 8/2010 | Kakuya ............... F02D 13/0265 123/295 |

FOREIGN PATENT DOCUMENTS

| AT | 005 720 | 10/2002 |
| DE | 10 2006 041 467 | 3/2007 |

(Continued)

OTHER PUBLICATIONS

Jari Hynönen, "Operating Conditions Using Spark Assisted HCCI Combustion During Combustion Mode Transfer to SI in a Multi-Cylinder VCR-HCCI Engine", SAE International, SAE World Congress, Detroit MI, 2005.

(Continued)

*Primary Examiner* — Lindsay Low
*Assistant Examiner* — Syed O Hasan
(74) *Attorney, Agent, or Firm* — Klaus J. Bach

(57) ABSTRACT

An operating mode for an internal combustion engine, in particular a directly injected internal combustion engine having a plurality of combustion chambers, in particular for a directly injected gasoline engine, e.g. for a motor vehicle, having low NOx combustion (NAV). During the NAV operating mode that is the subject matter of this invention, at an ignition point (ZZP) a largely homogeneous, lean fuel/exhaust gas/air mixture having a combustion air ratio of $\lambda \geq 1$ in the respective combustion chamber is spark ignited by an ignition device, whereby the flame front combustion initiated by the ignition device (FFV) transitions to a controlled auto-ignition (RZV). The NAV operating mode enables a controlled auto-ignition to be performed in an engine load range in which a pure RZV operating mode is no longer stable enough to be implemented.

11 Claims, 2 Drawing Sheets

(51) Int. Cl.
*B60T 7/12* (2006.01)
*F02B 11/00* (2006.01)
*F02D 41/30* (2006.01)
*F02D 41/00* (2006.01)

(56) References Cited

FOREIGN PATENT DOCUMENTS

| DE | 10 2006 044 523 | 3/2007 |
|----|-----------------|--------|
| EP | 1 543 228 | 1/2007 |
| EP | 2 058 499 | 5/2009 |
| JP | 2006 500509 A | 1/2006 |
| JP | 2008 025534 A | 2/2008 |
| JP | 2009 115025 A | 5/2009 |

OTHER PUBLICATIONS

Jurgen Williand et al., "DAS GCI-Brennverfahren Von Volkswagen", MTZ 0412008 Jahrgang 69, pp. 352-358.

Van Basshuysen et al., Handbuch Verbrennungsmotor, "15.2.1 Brennverfahren von Port-Fuel-Injection—(PFI)—Motoren", 2002, p. 519.

Robert Wagner, "On the Nature of Cyclic Dispersion in Spark Assisted HCCI Combustion", SAE International, SAE World Congress, Detroit, MI 2006.

\* cited by examiner

METHOD OF OPERATING AN INTERNAL COMBUSTION ENGINE WITH LOW NO$_x$ COMBUSTION

CROSS-REFERENCE TO RELATED APPLICATION

This is a continuation-in-part application of pending international application PCT/EP2011/005003 filed Oct. 7, 2011 and claiming the priority of German Application No. 10 2010 047 796.6 filed Oct. 7, 2010 and the priority of German Application No. 10 2011 015 626.7 filed Mar. 31, 2011.

BACKGROUND OF THE INVENTION

The present invention describes an operating mode for an internal combustion engine, in particular for a reciprocating piston engine, for example, for a gasoline engine with direct injection in a motor vehicle, having low-NOx combustion (NAV).

Downsizing can be used in the automotive engineering sector, in addition to other measures, in order to reduce $CO_2$ emissions. In this context downsizing means constructing, employing and operating small-displacement engines in such a way that they achieve equivalent or better rankings with respect to driving behaviour when compared to their predecessor large-displacement engines. Downsizing allows fuel consumption to be reduced and thus $CO_2$ emissions to be lowered. In addition, engines with smaller displacements have lower absolute frictional losses.

Smaller displacement engines are, however, characterised by having lower torque, especially at low speeds, leading to the vehicle having a poorer dynamic response and thus reduced flexibility. Disadvantages associated with the downsizing of gasoline engines can be largely compensated for through appropriate operating modes.

An operating mode is known from EP 1 543 228 B1 wherein, for example, a lean fuel/exhaust gas/air mixture in the combustion chamber of the internal combustion engine is caused to auto-ignite. In order that compression ignition occurs at the desired time, fuel is introduced into the lean, homogeneous fuel/exhaust gas/air mixture in the combustion chamber at the appropriate compression shortly before being spark ignited, so that a richer fuel-air mixture is formed embedded in the lean, homogeneous fuel/exhaust gas/air mixture. This rich fuel-air mixture serves as the initiator for compression-ignited combustion in the combustion chamber.

DE 10 2006 041 467 A1 contains a description for an operating mode for a gasoline engine having homogeneous compression-ignited combustion. If the homogeneous fuel/exhaust gas/air mixture, said mixture being a lean mixture, is compressed, in contrast to otto-cycle operating mode, combustion does not spread in the combustion chamber as a flame front originating from the point of ignition, but instead at an appropriate compression level the homogeneous fuel/exhaust gas/air mixture ignites at several points in the respective combustion chamber almost simultaneously, so that in this case controlled auto-ignition sets in. Controlled auto-ignition (RZV) exhibits significantly lower nitrogen oxide emissions along with high efficiency in terms of fuel consumption compared to the spark-ignition otto-cycle. This low-emission, efficient RZV operating mode with controlled auto-ignition can, however, only be used at a lower and possibly medium engine load/engine speed range, as knocking tendency increases with decreasing charge dilution, and thus the useful application of the RZV operating mode in higher engine load ranges is limited.

The present invention is concerned with the problem of specifying an improved, or at least an alternative operating mode for an, in particular directly injected, internal combustion engine, which is characterised in particular by reliable operating stability, inter alia in a higher engine load range with simultaneous low-NOx combustion.

SUMMARY OF THE INVENTION

According to the invention, this problem is solved by the subject-matter of the independent claim. Advantageous embodiments are the subject matter of the dependent claims.

The invention is based on the general idea, as part of an operating mode for an internal combustion engine, in particular a directly injected internal combustion engine having a plurality of combustion chambers, in particular for a direct-injection gasoline engine, for example in a motor vehicle, said operating mode having at least in part low-NOx combustion (NAV), whereby at an ignition point (ZZP), a largely homogeneous, lean fuel/exhaust gas/air mixture in the respective combustion chamber having a combustion air ratio of $\lambda \geq 1$ is spark ignited by means of an ignition device in such a way that the flame front combustion (FFV) initiated by the spark-ignition in the respective combustion chamber transitions to a controlled auto-ignition (RZV).

This operating mode, that is the subject matter of this invention, is hereinafter referred to as the NAV partial operating mode.

In an advantageous embodiment, by using the NAV partial operating mode, a controlled auto-ignition (RZV) can at least partially be implemented at a higher engine load and/or engine speed range than is possible with a pure RZV partial operating mode. By using spark ignition, a reliable ignition of the fuel or exhaust gas/air mixture in the combustion chamber is thereby ensured, even at higher engine load or engine speed ranges. In the NAV partial operating mode too, the NO$_x$ emissions are advantageously lowered and efficiency in terms of fuel consumption is increased when compared to a otto-cycle partial operating mode as a result of the controlled auto-ignition (RZV) that is taking place.

A directly injected internal combustion engine having a plurality of combustion chambers can be operated according to different operating modes. In this way various otto-cycle operating modes are possible. The stoichiometric otto-cycle operating mode has a combustion air ratio or air/fuel ratio $\lambda=1$ and is spark ignited by an ignition device, whereby flame front combustion (FFV) is initiated. The stoichiometric operating mode of the otto-cycle can be applied throughout the entire engine load and/or engine speed range. In a preferred embodiment it is used over other operating modes at the high engine load or engine speed range.

An otto-cycle operating mode can be spark ignited even with excess air, and can thus be implemented with a combustion air ratio $\lambda>1$. This operating mode is also commonly referred to as the DES operating mode (Stratified Direct Injection), whereby a stratified, overall lean fuel/exhaust gas/air mixture is formed in the respective combustion chamber by multiple direct fuel injections. Due to its stratified composition, at least in an idealised system, each combustion chamber has two regions having different combustion air ratios $\lambda$. This stratification is typically generated through multiple fuel injections. First, a lean, homogeneous fuel/exhaust gas/air mixture may be introduced into the respective combustion chamber by one or more injections of fuel. Into this lean, homogeneous region, a fuel/air mixture that is richer than that in the lean, homogeneous region, is then positioned in the area of the ignition device through a final injection of fuel that can also take the form of multiple injections. This method is commonly referred to as HOS (Homogenous Stratified Mode). The overall lean fuel/exhaust gas/air mixture in the combustion chamber can be ignited and reacted through flame front combustion (FFV) by the richer fuel/air mixture in the area of the ignition device. The DES and HOS partial operating modes are preferred in the lower engine load and/or engine speed range.

The DES and HOS partial operating modes can also be compression ignited, but are then usually no longer referred to as DES or HOS partial operating modes.

At lower engine load and/or motor speed ranges, the RZV operating mode can likewise be implemented, whereby a lean, homogeneous fuel/exhaust gas/air mixture in the respective combustion chamber is triggered by controlled auto-ignition and therefore compression ignited. In contrast with an otto-cycle operating mode, wherein a flame front combustion (FFV) occurs through spark ignition, with the RZV operating mode, the fuel/exhaust gas/air mixture in the respective combustion chamber ignites in multiple regions of the respective combustion chamber almost simultaneously, so that controlled auto-ignition occurs. The RZV operating mode features significantly lower NOx emissions compared to the otto-cycle operating mode while at the same time being characterised by lower fuel consumption.

The NAV operating mode that is the subject matter of the invention can be thought of as being a combination of a spark ignited, otto-cycle operating mode and a RZV operating mode. Thus, for the NAV operating mode there exists a homogeneous, lean fuel/exhaust gas/air mixture that is spark ignited by means of an ignition device. In the NAV operating mode, however, following an initial flame front combustion (FFV), the combustion of the homogeneous fuel/exhaust gas/air mixture transitions to a controlled auto-ignition (RZV). As a result, the NAV operating mode exhibits lower fuel consumption and reduced NOx emissions when compared to the otto-cycle operating mode due to the controlled auto-ignition (RZV).

In contrast to the RZV operating mode, during the NAV operating mode combustion is spark ignited by an ignition device. For this reason, amongst others, operating stability of the mixture ignition and/or combustion is significantly improved, especially in the higher end of the engine load or engine speed range. Thus the homogeneous, lean fuel/exhaust gas/air mixture starts to combust with a kind of a otto-cycle flame front combustion (FFV) that then transitions into a controlled auto-ignition (RZV). In this way the NAV operating mode combines the advantages of controlled auto-ignition (RZV) with the operationally-stable otto-cycle ignition of the fuel/exhaust gas/air mixture. Implementation of the NAV operating mode, that is the subject matter of the invention, can thus be controlled by supplying an appropriate fuel/exhaust gas/air mixture to each combustion chamber, as well as by means of spark igniting at the correct time by means of an ignition device.

The NAV operating mode is characterised by a low pressure gradient and a reduction in knocking tendency. As a result, the NAV operating mode makes controlled auto-ignition (RZV) feasible in a higher engine load range at which the pure RZV operating mode is no longer operationally stable enough due to the increasing pressure gradient and irregular combustion conditions and above all because of the increased knocking tendency.

A comparison of the operating modes leads to the following conclusion:

| Operating mode | Fuel consumption | NO$_x$ emissions | Application | Engine smoothness |
|---|---|---|---|---|
| otto-cycle $\lambda = 1$ | +/− | +/− | +++ | +/− |
| DES | +++ | −− | + | +/− |
| RZV | ++ | +++ | + | +/− |
| NAV | ++ | ++ | ++ | ++ |

(− ≙ deterioration, + ≙ improvement, ++ ≙ much improvement, +++ ≙ very much improvement)

As a result, operating modes with controlled auto-ignition (RZV) exhibit both a lower fuel consumption and reduced NOx emission values when compared with stoichiometric otto-cycle combustion systems. Moreover, through the NAV operating mode the applicable range can be extended to include the efficient controlled auto-ignition mode. With the NAV combustion process, engine smoothness is also improved when compared to the operating modes with compression ignition.

A lean fuel/exhaust gas/air mixture is a fuel/exhaust gas/air mixture that has an air/fuel ratio of $\lambda>1$ and thus an excess of air, whereas a rich fuel/exhaust gas/air mixture has an air/fuel ratio of is $\lambda<1$. A stoichiometric ratio is $\lambda=1$.

The combustion air ratio is a dimensionless physical quantity that is used to describe the composition of a fuel/exhaust gas/air mixture. The combustion air ratio $\lambda$ is calculated as a quotient of the actual air mass available for combustion and the minimum stoichiometric air mass required for a complete combustion of the available fuel. Accordingly, if $\lambda=1$, one talks of a stoichiometric combustion air ratio or fuel/exhaust gas/air mixture, and when $\lambda>1$ of a lean air combustion ratio or fuel/exhaust gas/air mixture. Furthermore, if $\lambda=1$ or $\lambda<1$, one talks of a rich combustion air ratio or fuel/exhaust gas/air mixture.

In a preferred embodiment, there is a combustion air ratio at the point of ignition for the NAV operating mode between 1 and 2.

Furthermore, the composition of the fuel/exhaust gas/air mixture can be specified by the charge dilution. Regardless of whether there is a lean, rich or stoichiometric fuel/exhaust gas/air mixture, the charge dilution dictates how much fuel in relation to the other components of the fuel/exhaust gas/air mixture was introduced into the combustion chamber. The charge dilution is the ratio of the mass of fuel to the total mass of the fuel/exhaust gas/air mixture that is present in the respective combustion chamber.

In a preferred embodiment, a charge dilution is set to between 0.03 and 0.05 for the NAV operating mode.

Because ignition timing plays a crucial role in the NAV operating mode, in a preferred embodiment the ignition point is set to occur at a crank angle (CA) of between −45° and −10°.

The crank angle (CA) is the position in degrees of the crankshaft in relation to the movement of the piston in the cylinder or combustion chamber. In the case of a four-stroke cycle, where an intake stroke is followed by a compression stroke, then an expansion stroke and subsequently an exhaust stroke, the top dead centre (TDC) position of the retracted piston in the respective combustion chamber or cylinder between the compression stroke and the expansion stroke is usually assigned a crank angle (CA) of 0°. Starting from this top dead centre position at 0° CA, the crank angle increases towards the expansion stroke and exhaust stroke and decreases towards the compression stroke and intake stroke. Using the described gradation system, the intake stroke occurs between −360° CA and −180° CA, the compression stroke between −180° CA and 0° CA, the expansion stroke between 0° CA and 180° CA and the exhaust stroke between 180° CA and 360° CA.

In this context, a "centre of combustion" is understood to mean the combustion condition in the respective combustion chamber at which 50% of the injected fuel has been consumed. This is typically calculated on the basis of the first law of thermodynamics. Consequently, the position of the centre of combustion is the corresponding crank angle at which 50% of the fuel that is introduced into the respective combustion chamber has been consumed.

In a preferred embodiment, the position of the centre of combustion for the NAV operating mode is at a crank angle of 8°. It can be advantageous to retard this at high engine loads.

When a largely homogeneous, lean fuel/exhaust gas/air mixture is referred to, this is understood to be a homogeneous, lean fuel/exhaust gas/air mixture that is essentially uniformly distributed in the respective combustion chamber. In an ideal situation there is a completely homogeneous distribution. In a realistic scenario, small inhomogeneities can be present, but they have no significant impact on the respective operating mode. This type of homogenous, lean fuel/exhaust gas/air mixture can be produced by single or multi-point fuel injection. In a preferred embodiment the injections or multi-point injections of fuel are performed dependent on load and/or engine speed.

In a preferred embodiment, the NAV operating mode is implemented at an engine speed of between 5% and 70% of the internal combustion engine's maximum speed.

In a likewise preferred embodiment, the NAV operating mode is implemented at an engine load of between 10% and 70% of the internal combustion engine's maximum load.

In addition, an internal exhaust gas recirculation can be effected as part of the NAV partial operating mode in order to preheat the fuel/exhaust gas/air mixture in the respective combustion chamber. This exhaust gas recirculation can be implemented as exhaust gas re-induction or exhaust gas retention. With exhaust gas re-induction, exhaust gas is fed into the respective combustion chamber through expulsion of the exhaust gas into the air intake and/or into the exhaust section with subsequent re-induction. As an alternative to, or in addition to exhaust gas re-induction, internal exhaust gas recirculation through the retention of exhaust gas can be implemented, wherein a portion of the exhaust gas is retained in the respective combustion chamber. In order to cool the fuel/exhaust gas/air mixture, external exhaust gas recirculation can be performed whereby the externally recirculated exhaust gas can be additionally cooled.

In a preferred embodiment, the $NO_x$ emission values of the NAV operating mode lie between 0.5 to 4 g per kilowatt hour of driving.

The NAV operating mode can be implemented in combination with, and/or in addition to a spark ignited, stratified DES operating mode.

In this case, a preferred embodiment allows the ignition point (ZZP) and/or position of the centre of combustion to be set at a crank angle that corresponds to the crank angle at the ignition point (ZZP) and/or the position of the centre of a spark ignited, stratified DES operating mode.

In this case, a preferred embodiment involves the NAV operating mode being implemented at an engine speed range and/or engine load range at which a spark ignited, stratified DES operating mode is also possible.

In a particularly preferred embodiment, the NAV operating mode is implemented in combination with, and/or in addition to a RZV operating mode having pure controlled auto-ignition (RZV).

In a preferred embodiment, a NAV partial operating mode with substantially pure NAV combustion (NAV) is implemented as one such partial operating mode having at least partial NAV combustion (NAV). Here, substantially pure controlled auto-ignition (RZV) is understood to be ideally an RZV partial operating mode where exclusively controlled auto-ignition takes place. A certain percentage of another type of combustion can nevertheless take place as a result of disturbances, such an eventuality being encompassed by the formulation "substantially pure controlled auto-ignition (RZV)". The main reason for this formulation is that the RZV partial operating mode involves substantially pure controlled auto-ignition (RZV), whereby disruptions of the partial operating mode can result in other combustion processes occurring that do not, however, predominate the pure controlled auto-ignition (RZV) or are a significant part of the partial operating mode.

Further important features and advantages of the invention arise from
The sub-claims, from the diagrams and from the descriptions based on the diagrams.

It is understood that the features that are mentioned above and those
still to be described in the following can be used not only in the combination specified in each case, but also in other combinations or individually, without exceeding the scope of the present invention.

BRIEF DESCRIPTION OF THE DRAWINGS

Preferred exemplary embodiments of the invention are illustrated in the figures and explained in more detail in the description below, whereby the same reference numerals refer to the same or similar or functionally identical components.

Depicted schematically in each case are.

DETAILED DESCRIPTION OF THE PARTICULAR EMBODIMENTS

Figure 1:
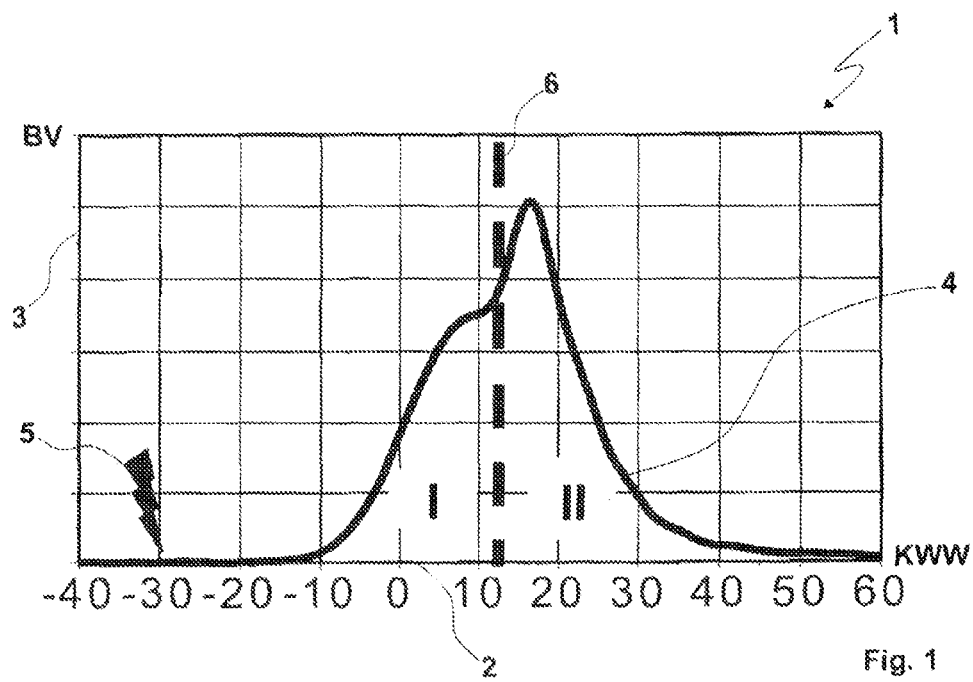
FIG. 1: a graphical representation of a combustion curve of the NAV operating mode.

FIG. 1 shows a combustion curve diagram 1 of a NAV operating mode, where the crank angle CA is plotted along the X-axis 2 in degrees, where a combustion curve BV is plotted up the Y-axis in Joules. The combustion process of the NAV operating mode is represented by a curve 4. A fuel/exhaust gas/air mixture introduced into the respective combustion chamber is spark ignited at an ignition point 5 and at a crank angle of −30°+/−5° CA. Up to a boundary line 6 the fuel/exhaust gas/air mixture introduced into the respective combustion chamber burns with a otto-cycle flame front combustion (FFV). After the boundary line 6, the fuel/exhaust gas/air mixture, which has become further heated and subjected to increased pressure by the flame front combustion (FFV), begins to transition to a controlled auto-ignition (RZV). A sufficiently high pressure and temperature required for compression ignition are built up by the advancing flame front combustion (FFV). In this way the NAV operating mode can be divided into a phase I having homogeneous flame front combustion (FFV) and a phase II having controlled auto-ignition (RZV), whereby both phases I, II are separated by the boundary line 6.

Figure 2:
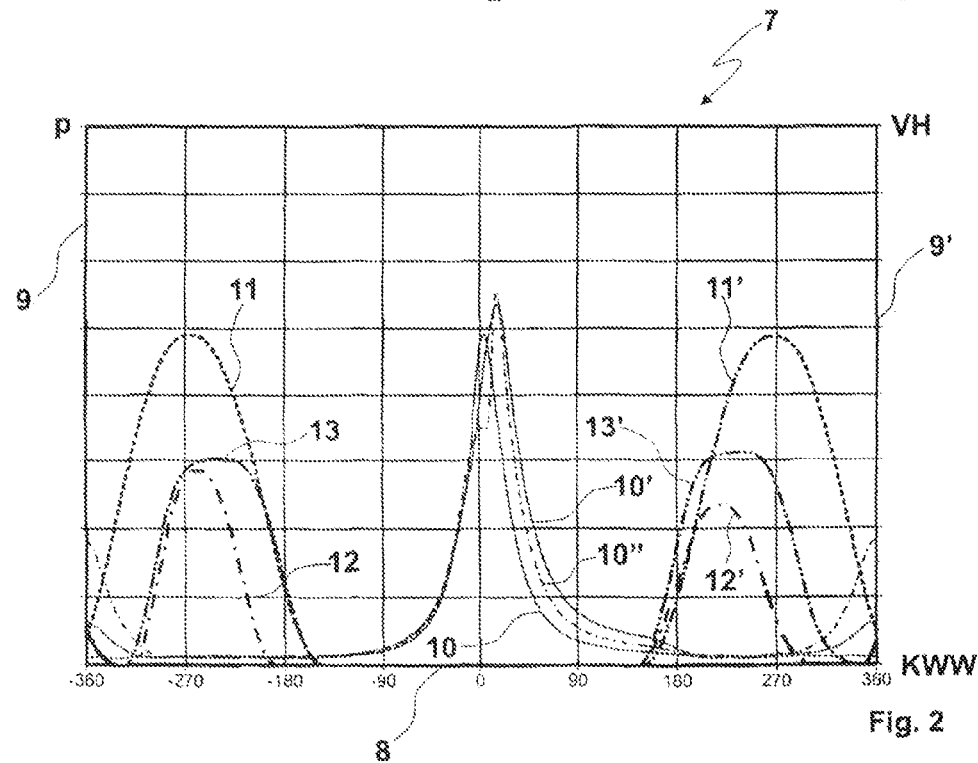
FIG. 2: a comparison of valve lift heights of an RZV, NAV, and DES operating mode.

FIG. 2 shows a cylinder pressure/valve lift diagram 7, where the crank angle CA is plotted along the X-axis 8 in degrees while the cylinder pressure P in bar (left) and the valve lift VH in millimetres (right) is plotted up the Y-axis 9,9'. The curves 10, 10', 10" reference the cylinder pressure curves of the DES, RZV, and NAV operating modes respectively. The cylinder pressure gradation of the left Y-axis 9 applies to these curves. Furthermore, the DES valve lift curves 11,11' the RZV valve lift curves 12,12' and the NAV valve lift curves 13,13' are plotted on the cylinder pressure/valve lift diagram 7. The valve lift gradation of the right Y-axis 9' applies to these curves. On comparing the valve lift curves 11,11', 12,12', 13,13' one notices that the NAV valve lift curves 13,13' are considerably smaller than the DES valve lift curves 11,11'. The DES valve lift curves 11,11' also span a larger range of crank angles than the NAV valve lift curves 13,13'. As a result, exhaust gas retention or an internal exhaust gas recirculation is hardly possible with this type of DES valve lift curve 11,11'. In contrast to this, NAV valve lift curves such as 13, 13' allow an internal exhaust gas recirculation and/or an exhaust gas retention to be implemented.

If one now compares the RZV valve lift curves 12,12' and the NAV valve lift curves 13,13', one finds that the NAV valve lift curves 13,13' exhibit a slightly greater valve lift and moreover, they span a wider range of crank angles than the RZV valve lift curves 12,12'. Consequently, such RZV valve lift curves 12,12' are characterised by a larger exhaust retention or internal exhaust gas recirculation, and allow as a result higher temperatures to be set in the combustion chamber. Due to the small amount of lift and short opening times, however, the air flow is greatly restricted. As a result, such RZV valve lift curves 12,12' are of only limited use for a high engine load range. This is improved with the illustrated NAV valve lift curves 13,13', since on the one hand higher valve lifts can be set, and on the other the valve remains open through a wider range of crank angles. Thus using such NAV valve lift curves as 13,13' allows a lower temperature in the particular combustion chamber to be set, and the intake air volume is greater than with the RZV valve lift curves 12,12' illustrated in FIG. 2.

Figure 3:
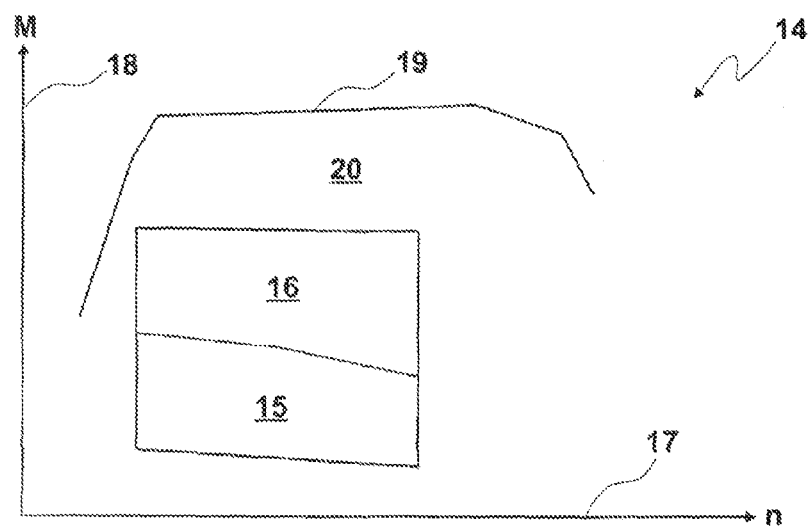
FIG. 3: a graphical representation of an engine characteristics map of the RZV and NAV operating modes.

FIG. 3 shows an engine load/engine speed diagram 14, wherein an engine characteristics map 15 for the RZV operating mode and an engine characteristics map 16 for the NAV operating mode are plotted. In the engine load/engine speed diagram 14, the engine speed n is plotted along the X-axis 17 while the engine load M is plotted up the Y-axis 18. A boundary curve 19 delimits the engine load and engine speed range within which the internal combustion engine can be operated. In the engine load/engine speed range 20, which is not encompassed by the engine characteristics map 15 of the RZV operating mode or by the engine characteristics map 16 of the NAV operating mode, an otto-cycle operating mode can be implemented.

Figure 4:
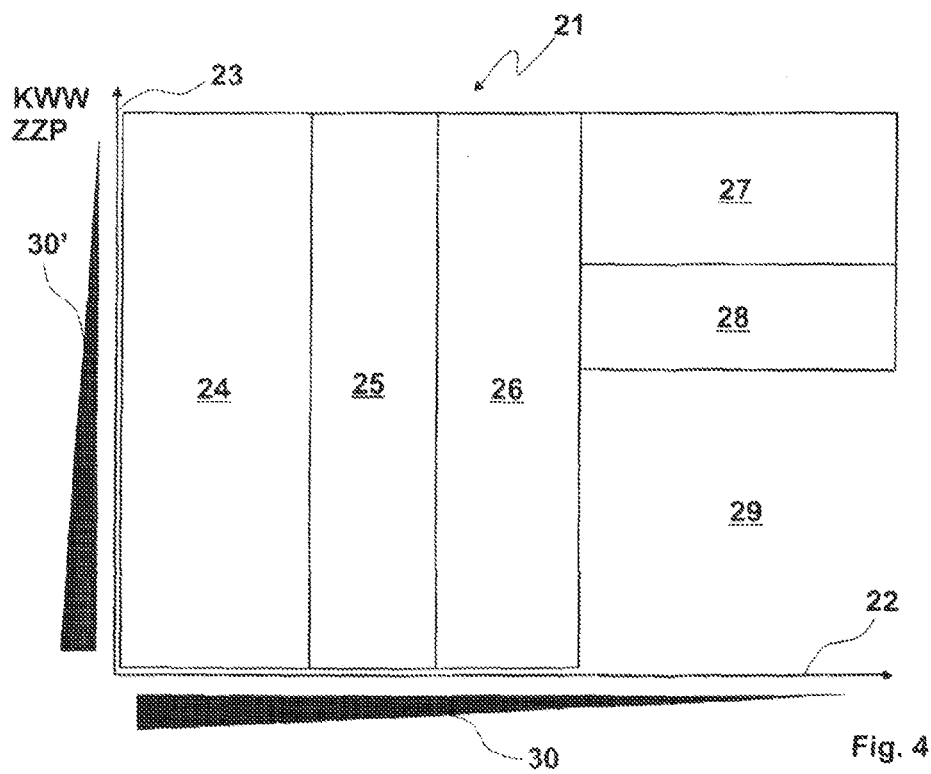
FIG. 4: Setting conditions for the RZV and NAV operating mode.

A settings configuration diagram 21 is shown in FIG. 4 that schematically depicts the setting conditions for the RZV operating mode and for the NAV operating mode. The charge dilution is plotted along an X-axis 22 that decreases in the direction of the X-axis 22 as illustrated by a tapered bar 30. Correspondingly, the engine load increases along the X-axis 22. The crank angle (CA) at the ignition point (ZZP) is plotted up a Y-axis 23, said crank angle likewise decreasing in the direction of Y-axis 23 as illustrated by a tapered bar 30'. The operating ranges 24, 25, 26, 27, 28, 29 are mapped in the settings condition diagram 21. The operating range 24 characterises a possible operating range for the RZV operating mode. In this very high charge dilution range it is not possible to spark ignite the correspondingly dilute fuel/exhaust gas/air mixture with an ignition device. The RZV operating mode can advantageously be implemented in this operating range 24. With decreasing charge dilution, both the RZV operating mode as well as the NAV operating mode can be advantageously implemented in operating range 25. By using the NAV operating mode, the position of the centre of combustion can be shifted to occur at an earlier crank angle by means of the ignition timing.

If one further lowers the charge dilution, one enters the operating range 26. While it is possible to implement the RZV operating mode in said operating range 26, in this charge dilution range, the RZV operating mode exhibits an increased knocking tendency and is characterised by a correspondingly large increase in pressure. For this reason, in this charge dilution range the RZV operating mode suffers from increased operating instability that can be mitigated, for instance, through an external exhaust gas recirculation. This operating range 26 can be bypassed by the NAV operating mode, whereby the location of the centre of combustion can in this case likewise be shifted to occur at a lower crank angle by the appropriate choice of ignition timing (ZZP).

The NAV operating mode is preferentially implemented in the operating range 27. An otto-cycle operating mode can be implemented in the operating range 28. It is usually not possible to implement either the RZV, NAV or DES operating modes in the operating range 29.

The compression ratio of the internal combustion engine must be advantageously calculated in order to further improve operation of the internal combustion engine. In particular, the NAV partial operating mode is implemented with a compression ratio $\epsilon$ of between 10 and 13.

The compression ratio $\epsilon$ is the quotient of the compression volume of the combustion chamber when the piston is at its top dead centre position and the sum of the compression volume and the swept volume of the combustion chamber when the piston is at its bottom dead centre position.

When switching from the RZV partial operating mode to the NAV partial operating mode, the compression ratio $\epsilon$ is lowered. As a result of the lower compression ratio $\epsilon$, the knocking tendency is significantly reduced, and an earlier centre of combustion, as well as a resultant increase in operational stability for the NAV partial operating mode, is effected.

When switching from the NAV partial operating mode to the RZV partial operating mode, the compression ratio $\epsilon$ is raised.

What is claimed is:

1. A method of operating an internal combustion engine with exhaust gas recirculation, comprising the steps of:
   in a region of an engine characteristics map for low to medium speed and/or low to medium load, establishing a first operating mode with a lean fuel/exhaust gas/air mixture that is ignited by compression ignition and combusts by controlled auto-ignition (RZV), and,
   upon a load or speed increase, establishing, a second operating mode based on another region of the engine characteristics map with low-NOx combustion (NAV),
   wherein at an ignition point (ZZP), a homogeneous, lean fuel/exhaust gas/air mixture with a combustion air ratio $\lambda \geq 1$ is provided and the mixture in a first combustion phase is compressed, at an angle of about 30 degrees before top dead center, the mixture is spark ignited by means of an ignition device, so that a flame front combustion (FFV) is initiated by the spark ignition whereby the mixture is further compressed and heated resulting in a second combustion phase with controlled auto-ignition (RZV) and combustion of the remaining lean fuel/exhaust gas/air mixture.

2. The operating method of operating an internal combustion engine according to claim 1, wherein at the ignition point (ZZP) a combustion air ratio λ is between 1 and 2.

3. The method of operating an internal combustion engine according to claim 1, wherein at the ignition point (ZZP) there is a charge dilution of between 0.030 and 0.05 of fuel/total mass of the combustion chamber contents.

4. The method of operating an internal combustion engine mode according to claim 1, wherein the ignition point (ZZP) lies at a crank angle (CA) of between −45° and −10°, and/or the center of combustion lies at a crank angle (CA) of 8°, and retarding or advancing the center of combustion depending on the engine load and the temperature level in the cylinder.

5. The method of operating an internal combustion engine according to claim 1, wherein the largely homogeneous, lean fuel/exhaust gas/air mixture is produced by a plurality of injection providing for the largely homogeneous, lean fuel/exhaust gas/air mixture depending on the engine load and/or engine speed.

6. The method of operating an internal combustion engine according to claim 1, wherein the second operating mode is implemented at an engine speed of between 5% and 70% of the internal combustion engine's maximum engine speed and/or at an engine load of between 10% and 70% of the internal combustion engine's maximum engine load.

7. The method of operating an internal combustion engine according to claim 1, wherein an internal exhaust gas recirculation and/or an external exhaust gas recirculation is performed.

8. The method of operating an internal combustion engine according to claim 1, wherein the $NO_x$ emission values of the second operating mode lie between 0.5 and 4 g/kWh.

9. The method of operating an internal combustion engine according to claim 1, wherein the operating method is implemented in combination with a spark ignited, stratified DES operating mode (stratified direct Injection), and/or the ignition point (ZZP) and/or a position of the center of combustion corresponds to an ignition point (ZZP) and/or a position of the center of a spark ignited, stratified DES operating mode, and/or the operating mode is implemented at an engine speed range and/or engine load range at which a spark ignited, stratified DES operating mode is also possible.

10. The method of operating an internal combustion engine according to claim 1, wherein the operating mode is implemented in combination with, and/or in addition to, a RZV operating mode having pure controlled auto-ignition (RZV).

11. The method of operating an internal combustion engine according to claim 1, wherein when switching from the first operating mode to the second operating mode, a compression ratio ϵ is lowered, and when switching from the second operating mode back to the first operating mode, the compression ratio ϵ is raised.

* * * * *